(12) United States Patent
Wadekar et al.

(10) Patent No.: US 8,467,395 B1
(45) Date of Patent: Jun. 18, 2013

(54) METHOD AND SYSTEM FOR LINK AGGREGATION

(75) Inventors: Manoj K. Wadekar, San Jose, CA (US); Edward C. McGlaughlin, Minneapolis, MN (US); Gaurav Agarwal, Los Altos, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 147 days.

(21) Appl. No.: 13/181,251

(22) Filed: Jul. 12, 2011

(51) Int. Cl.
*H04L 12/28* (2006.01)

(52) U.S. Cl.
USPC .................. 370/395.32; 370/229; 370/255

(58) Field of Classification Search
None
See application file for complete search history.

(56) References Cited

U.S. PATENT DOCUMENTS

| | | | |
|---|---|---|---|
| 6,158,008 A | 12/2000 | Maria et al. | |
| 6,888,818 B1 * | 5/2005 | Gubbi | 370/349 |
| 6,973,082 B2 | 12/2005 | Devi et al. | |
| 2002/0133617 A1 * | 9/2002 | Davies | 709/238 |
| 2011/0267947 A1 * | 11/2011 | Dhar et al. | 370/235 |
| 2012/0144065 A1 * | 6/2012 | Parker et al. | 709/241 |
| 2012/0215938 A1 * | 8/2012 | Fletcher et al. | 709/238 |
| 2012/0230225 A1 * | 9/2012 | Matthews et al. | 370/255 |
| 2012/0314605 A1 | 12/2012 | Akiyoshi | |

OTHER PUBLICATIONS

"Office Action from USPTO dated Jan. 30, 2013 for U.S. Appl. No. 13/181,270".
"Part 3: Carrier Sense Multiple Access with Collision Detection (CSMA/CD) Access Method and Physical Layer Specifications", *IEEE*, (2005), 1-454.
Wilson, et al., "Fibre Channel Framing and Signaling-3 (FC-FS-3) Rev 1.11", *American National Standards Institute Inc.*, (Oct. 22, 2010), pp. 1-422.
Wilson, et al., "Fibre Channel Link Services (FC-LS-2) Rev 2.21", *American National Standard Institute*, (Aug. 2, 2010), pp. 1-199.

* cited by examiner

*Primary Examiner* — Robert Wilson
(74) *Attorney, Agent, or Firm* — Klein, O'Neill & Singh, LLP

(57) ABSTRACT

Method and system for a first network device and a second network device is provided. The first network device and the second network device communicate with each other via a plurality of network links. A network packet field for applying a hashing technique for selecting one of the network links to transmit the network packet is negotiated between the first network device and the second network device. The hashing technique is identified for selecting the selected network link. The first network device and the second network device, prior to applying the hashing technique exchange hashing parameters.

15 Claims, 3 Drawing Sheets

METHOD AND SYSTEM FOR LINK AGGREGATION

TECHNICAL FIELD

The present embodiments relate to network communications.

BACKGROUND

A computer network, often simply referred to as a network, typically includes a group of interconnected computers and devices that facilitate communication between users and allows users to share resources. Adapters, switches and other devices are typically used during network communication. Continuous efforts are being made to improve network communication.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

In one embodiment, a machine implemented method for a first network device and a second network device, where the first network device and the second network device communicate with each other via a first network link and a second network link is provided. The method includes identifying a network packet field for applying a hashing technique for selecting either the first network link or the second network link to transmit the network packet; and exchanging a hashing parameter between the first network device and the second network device, prior to applying the hashing technique for selecting the first network link and the second network link.

In another embodiment, a machine implemented method for a first network device and a second network device, where the first network device and the second network device communicate with each other via a first network link and a second network link is provided. The method includes negotiating a network packet field for applying a hashing technique for selecting either the first network link or the second network link to transmit the network packet; identifying the hashing technique applied on the network packet field for selecting the first network link and the second network link; and exchanging a hashing parameter between the first network device and the second network device, prior to applying the hashing technique for selecting the first network link and the second network link.

In yet another embodiment, a system is provided. The system includes a first network device and a second network device, where the first network device and the second network device communicate with each other via a first network link and a second network link. The first network device and the second network device are configured to negotiate a network packet field for applying a hashing technique for selecting either the first network link or the second network link to transmit the network packet; identify the hashing technique applied on the network packet field for selecting the first network link and the second network link; and exchange a hashing parameter to select the first network link and the second network link for transmitting the network packet.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to selectable initialization for adapters now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
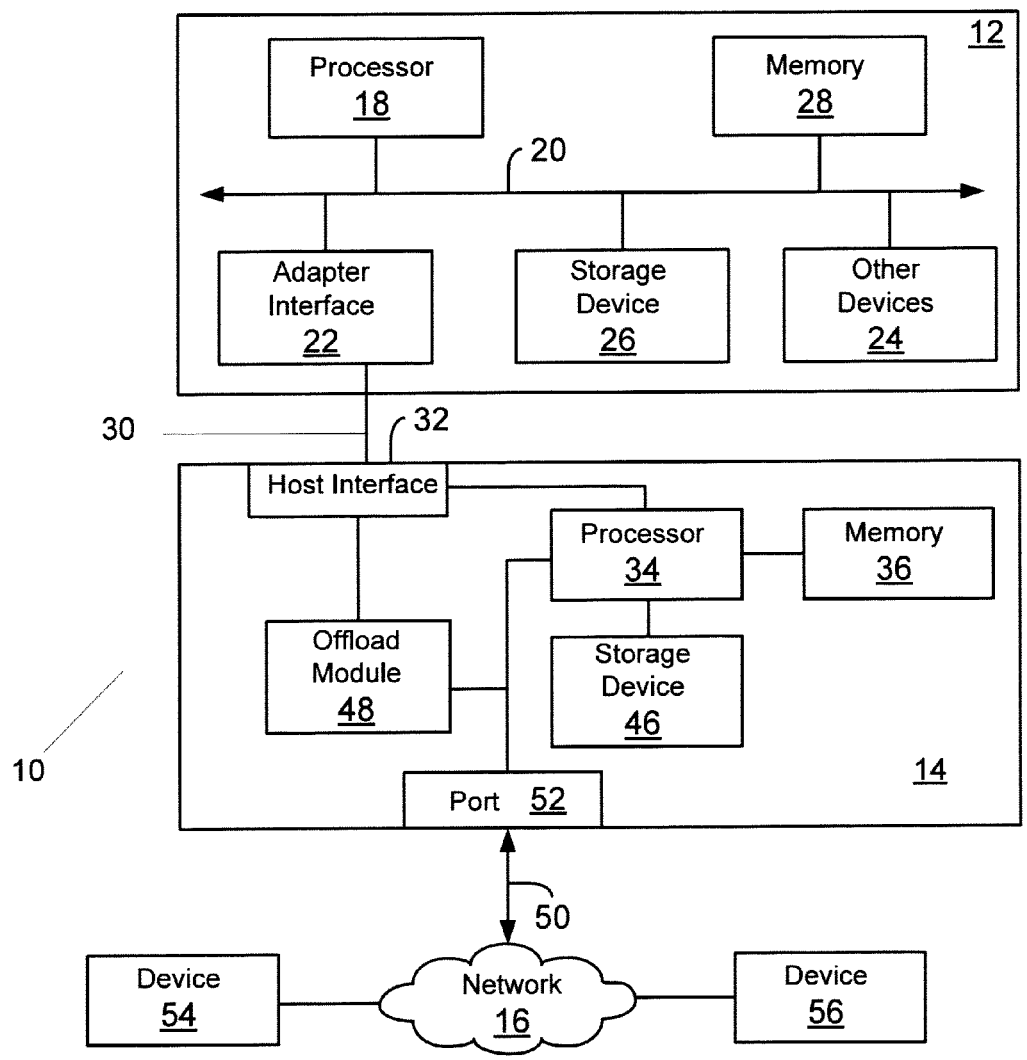
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent machine executable code that performs specified tasks when executed on a processing device or devices (e.g., hardware based central processing units). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be readable by a computing system, and encoding a computer program of instructions for executing a computer process.

FIG. 1A is a block diagram of a system 10 configured for use with the various embodiments. System 10 includes a computing system 12 (may also be referred to as "host system 12") coupled to an adapter 14 that interfaces with a network 16 for communicating with network devices 54 and 56. The network may include, for example, additional computing systems, servers, storage systems and other devices.

The computing system 12 may include one or more processors 18, also known as a hardware-based, central processing unit (CPU). The processor 18 executes computer-executable process steps out of a memory 28 and interfaces with an interconnect 20, which may also be referred to as a computer bus 20. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of interconnect.

An adapter interface 22 enables computing system 12 to interface with adapter 14, as described below. The computing system 12 also includes other devices and interfaces 24, which may include a display device interface, a keyboard interface, a pointing device interface, etc. The details of these components are not germane to the inventive embodiments.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 interfaces to the computer bus 20 to provide processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, a link 30 and the adapter interface 22 couple the adapter 14 to the computing system 12. The adapter 14 may be configured to send and receive network traffic complying with one or more protocols/standards, for example, Ethernet, Gigabit Ethernet, Transmission Control Protocol (TCP), Internet Protocol(IP) and others.

The adapter 14 interfaces with the computing system 12 via a host interface 32. In one embodiment, the host interface may be a Peripheral Component Interconnect (PCI) Express interface coupled to a PCI Express link (for example, link 30).

In one embodiment, adapter 14 includes an offload module 48 that is used to perform certain functions that are typically performed by a host system. As an example, offload module 48 may execute a network protocol stack, for example, a TCP/IP protocol stack for processing TCP/IP packets that are sent and received from other devices. In one embodiment, offload module 48 is a dedicated hardware resource for performing the offloaded function.

Adapter 14 may also include a processor 34 that executes firmware instructions out of memory 36 to control overall adapter 14 operations. Memory 36 may also store the process steps as described below, according to one embodiment.

The adapter 14 may also include storage 46, which may be for example non-volatile memory, such as flash memory, or any other device. The storage 46 may store executable instructions and operating parameters that can be used for controlling adapter operations.

The adapter 14 includes a network interface 52 (also referred to and shown as port 52) that interfaces with a link 50 for sending and receiving network traffic. In one embodiment, port 52 includes logic and circuitry for handling network packets, for example, Ethernet or any other type of network packets. Port 52 may include memory storage locations, referred to as memory buffers (not shown) to temporarily store information received from or transmitted to other network devices.

Figure 1B:
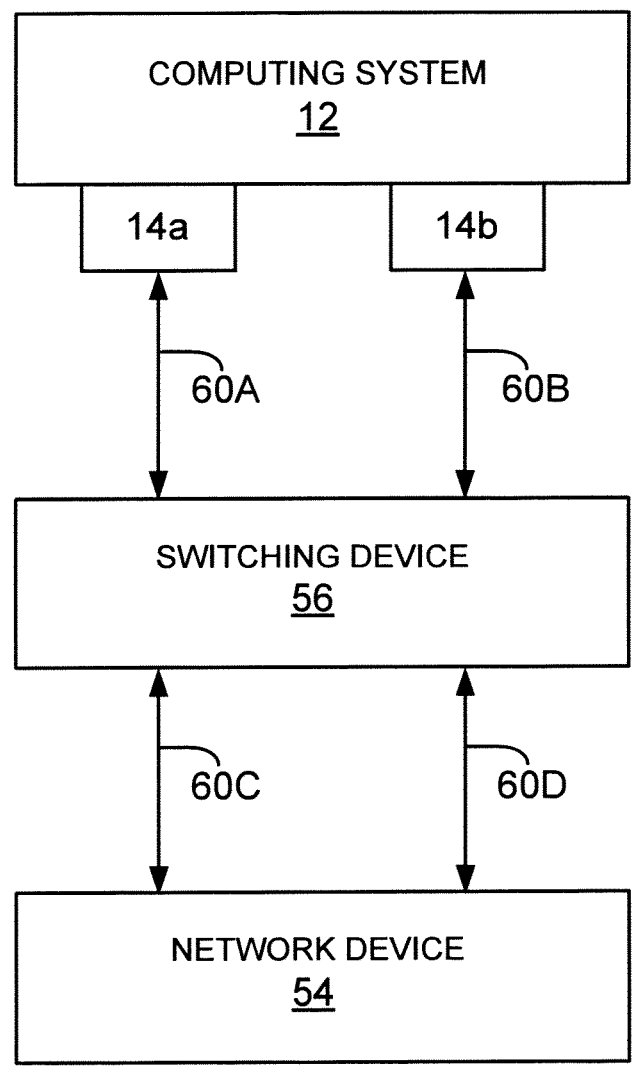
FIG. 1B shows an example of linking, according to one embodiment.

FIG. 1B shows an example of using link aggregation in system 10. The term link as used herein includes communication link used by network devices to send and receive information.

Link aggregation is typically used in networks to increase available bandwidth between two network nodes, for example, between computing system 12 and network device 54 (FIG. 1B). Certain standards, for example, IEEE 802.3ad provide a mechanism for pairing two network links (for example, 60A/60B and 60C/60D). Each network node distributes traffic among links/network ports by using certain techniques, for example, by executing a machine-executable hashing technique that uses one or more fields of a network packet header to select a link/port to send or receive a network packet. The following example illustrates link aggregation with respect to FIG. 1B.

FIG. 1B shows computing system 12 (may also be referred to as network node) communicating with another network device 54 (may also be referred to as computing system or network node) via a switching device 56. Computing system 12 may include two adapters 14a and 14b (similar to adapter 14 described above), each coupled to switching device 56 via links 60A and 60B. Switching device 56 is coupled to network device 54 via links 60C and 60D. Details of switching device 56 are not provided since they are not germane to the inventive embodiments.

When computing system 12 sends a message to network device 54, the hashing process executed by computing system 12 and/or one of adapters 14a/14b may select link 60A. However, the response from network device 54 may be received by computing system 12 via link 60B.

If adapters 14a and 14b use an offload module (for example, 48, FIG. 1A), then sending a packet via 60A and receiving the response via 60B at adapter 14b can cause problems. Typically, offload module 48 uses flow information per connection for sending and receiving packets. The packets are mapped to the same physical ports so that the offload module 48 can process a received packet. When return traffic ends up at adapter 14b having a different physical port, offload module 48 at adapter 14b is not able to process the packet because it does not maintain connection information of adapter 14a and hence, the offload operation may fail. It is desirable to use offload module 48 and take advantage of linking between communicating network nodes. The embodiments disclosed herein provide one such solution, as described below with respect to FIG. 2.

Figure 2:
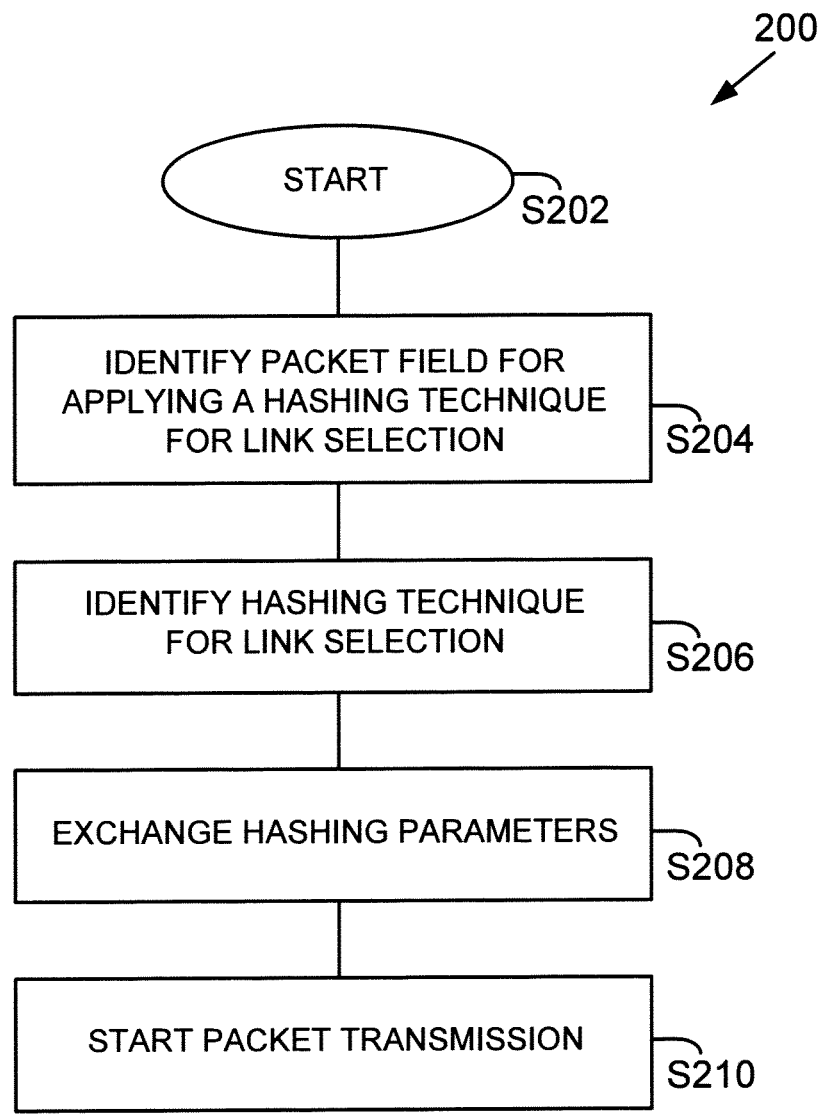
FIG. 2 is a process flow diagram, according to one embodiment.

FIG. 2 shows a process flow diagram of a process 200 that uses linking and an offload module between communicating nodes, according to one embodiment. Process 200 begins in block S202 when communicating devices (or nodes), for example, computing system 12 and network device 54, negotiate to establish certain protocols and parameters for communication. In block 5204, both nodes may negotiate and agree on one or more parameters (hash-type) that can be used to identify a connection/flow and on which a hashing technique is performed to select a link.

The type of parameter may depend on a protocol type. For example, for Ethernet based communication, the EtherType field may be used. An Ethernet frame includes a preamble, a destination Media Access Control (MAC) address field, a source MAC address field, an Ether type field, a payload and cyclic redundancy code (CRC). The Ether type field may be a two-octet field in an Ethernet used to indicate which protocol is encapsulated in the PayLoad of an Ethernet Frame.

For Fibre Channel over Ethernet packets, the fields may be a destination identifier (D_ID) or source identifier (S ID). For TCP packets, SRC-SKT (source socket number) or SRC-DST (destination socket number) may be used for identifying a flow.

It is noteworthy that the examples provided above are used to illustrate the adaptive embodiments, which are not limited to using any specific field for defining a connection flow, and on which a hashing technique is implemented.

In block 5206, a hashing algorithm that is used to select a link is identified and agreed upon by the communicating nodes. In one embodiment, the hashing algorithm generates an "n"-bit hash value where "n" may correspond to a number of physical ports within a link aggregation group. Various hashing algorithms are available and may be used. For example, "xor_nibble" algorithm that may use the MAC address for a destination or a source may be used to select a link. Another example may be the (a) Bit x=XOR (upper bits of each digit of M_DA (Destination MAC address in an Ethernet header) and M_SA (Source MAC address in an Ethernet header) may be used to select a link; or (b) Bit y=XOR (lower bits of each digit of M_DA and M_SA) may be used to select a link.

Hashing parameters are then exchanged in block S208. In one embodiment, the hashing algorithm, the hash type, and a "hash scope" may be hard coded and stored at a memory location available to both the communicating nodes 12 and 54. Hash scope in this context means the number of ports that are a part of a link aggregate. For example, if links 60A and 60B are aggregated, then two ports (for example, at adapters 14a and 14b) may be the hash scope.

In one embodiment, the hash type, hash scope and the hashing algorithm may be statically stored by an administrator (not shown) that configures the networking nodes. In another embodiment, the hash type, hash scope and algorithm may be dynamically exchanged, using a special packet while the nodes 12 and 54 are communicating.

In block S210, nodes 12 and 54 start packet transmission. The links for packet transmission are selected based on information exchanged in block S208.

In one embodiment, because the communicating nodes 12 and 54 agree on the hash type and the hash algorithm, the selected links are consistent and hence in an environment similar to FIG. 1B, one always receives packets via the same link that the packets are transmitted. Thus, the embodiments disclosed herein allow one to aggregate links, use multiple adapters and effectively use an offload module.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine-implemented method for selecting a communication link from among a plurality of communication links, the method comprising:

negotiating a network packet field for applying a hashing technique for selecting one of the plurality of links to transmit a network packet;

determining the hashing technique applied on the network packet field for selecting the one link of the plurality of links; and exchanging the network packet containing a hashing parameter packet field encoded in the network packet field; and upon receiving the network packet applying the hashing technique to the hashing parameter in order to select a communication link from among a plurality of communication links for communicating between a first network device and a second network device.

2. The method of claim 1, wherein the network packet is an Ethernet packet.

3. The method of claim 1, wherein the plurality of network links are Ethernet links.

4. The method of claim 1, wherein the first network device is a computing device having a first adapter that negotiates the network packet field, determines the hashing technique, and transmits the network packet the communication link via a second adapter that receives and processes the network packet for a second network device.

5. The method of claim 1, wherein a switch receives the network packet via the communication link and forwards the network packet to the second network device.

6. A system, comprising:

a first network device and a second network device;

wherein the first network device and the second network device communicate with each other via a plurality of network links;

wherein the first network device and the second network device are configured to:

negotiate a network packet field for applying a hashing technique for selecting one link of the plurality of network links to transmit the network packet;

determine the hashing technique applied on the network packet field for selecting the one link of the plurality of network links; exchange a network packet containing a hashing parameter packet field encoded in a network packet field; and upon receiving the network packet applying the hashing technique to the hashing parameter in order to select a communication link from among a plurality of communication links for communicating between a first network device and a second network device.

7. The system of claim 6, wherein the network packet is an Ethernet packet.

8. The system of claim 6, wherein the plurality of network links are Ethernet links.

9. The system of claim 6, wherein the first network device is a computing device having a first adapter that negotiates the network packet field, determines the hashing technique, and transmits the network packet the communication link via a second adapter that receives and processes the network packet for a second network device.

10. The system of claim 6, wherein a switch receives the network packet via the communication link and forwards the network packet to the second network device.

11. A machine-implemented method for selecting a communication link from among a plurality of communication links, the method comprising:

identifying a network packet field for applying a hashing technique for selecting one of the network links to transmit a network packet; and determining the hashing technique applied on the network packet field for selecting the one link of the plurality of links;

exchanging the network packet containing a hashing parameter packet field encoded in the network packet field;

upon receiving the network packet applying the hashing technique to the hashing parameter in order to select a communication link from among a plurality of communication links for communicating between a first network device and a second network device.

12. The method of claim 11, wherein the network packet is an Ethernet packet.

13. The method of claim 11, wherein the plurality of network links are Ethernet links.

14. The method of claim 11, wherein the first network device is a computing device having a first adapter that negotiates the network packet field, determines the hashing technique, and transmits the network packet the communication link via a second adapter that receives and processes the network packet for a second network device.

15. The method of claim 11, wherein a switch receives the network packet via the communication link and forwards the network packet to the second network device.

* * * * *

UNITED STATES PATENT AND TRADEMARK OFFICE
CERTIFICATE OF CORRECTION

| | | |
|---|---|---|
| PATENT NO. | : 8,467,395 B1 | Page 1 of 1 |
| APPLICATION NO. | : 13/181251 | |
| DATED | : June 18, 2013 | |
| INVENTOR(S) | : Manoj K. Wadekar et al. | |

It is certified that error appears in the above-identified patent and that said Letters Patent is hereby corrected as shown below:

In the Specification

In column 3, line 6, after "network" insert -- 16 --.

In column 3, line 59, after "interface" insert -- 32 --.

In column 5, line 7, delete "5204," and insert -- S204, --, therefor.

Signed and Sealed this
Twentieth Day of May, 2014

Michelle K. Lee
*Deputy Director of the United States Patent and Trademark Office*